March 30, 1943.  W. K. UPPERMAN  2,315,304
FISH LURE
Filed Nov. 5, 1941  2 Sheets-Sheet 1
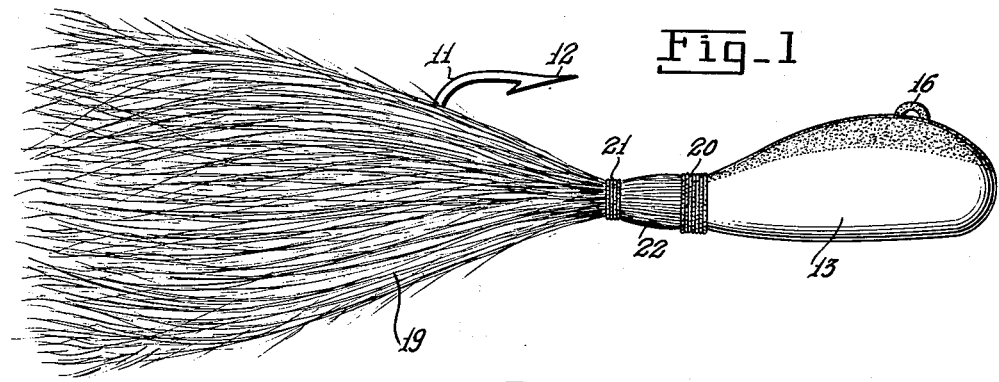
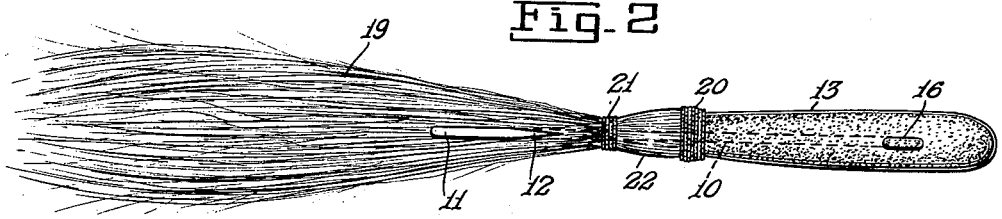
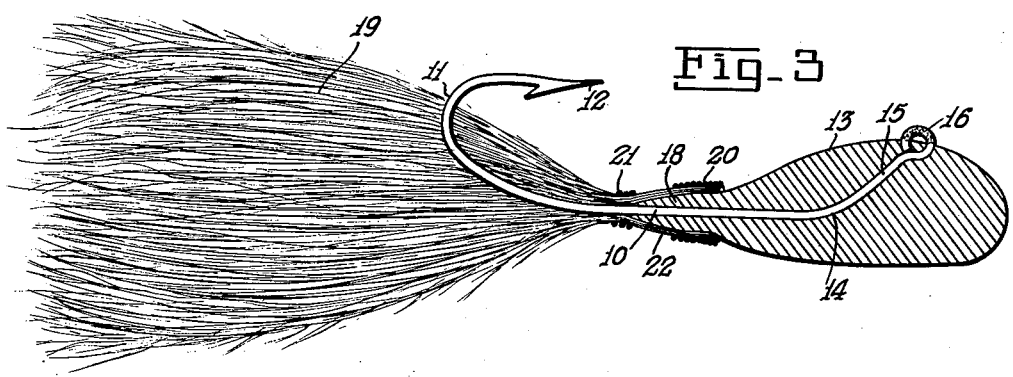
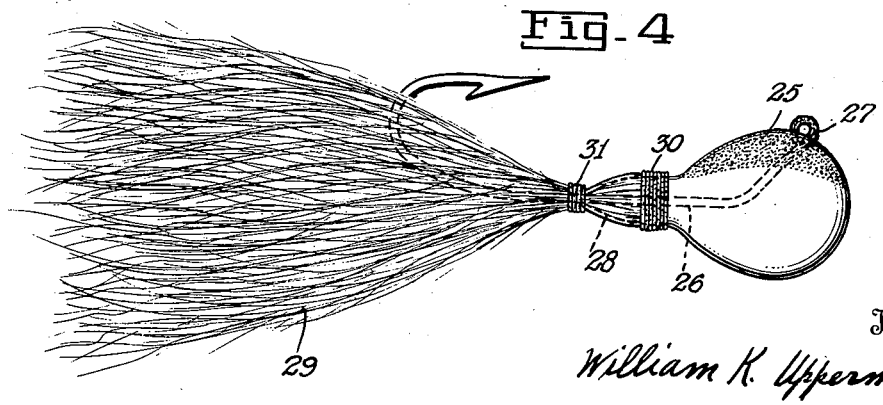
Inventor
William K. Upperman
By Pierce & Scheffler
Attorneys March 30, 1943.  W. K. UPPERMAN  2,315,304
FISH LURE
Filed Nov. 5, 1941  2 Sheets-Sheet 2
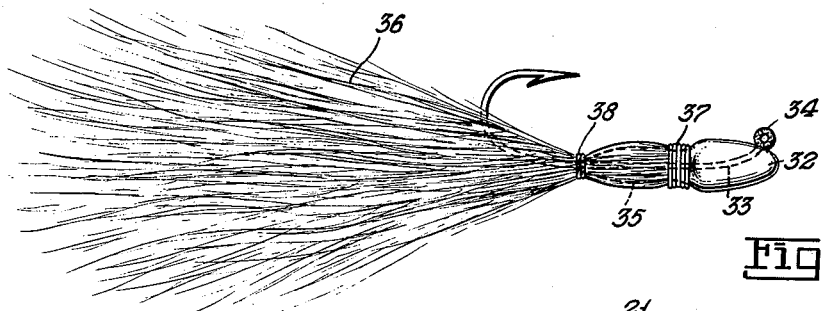
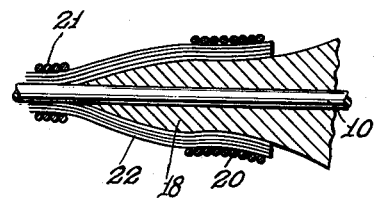
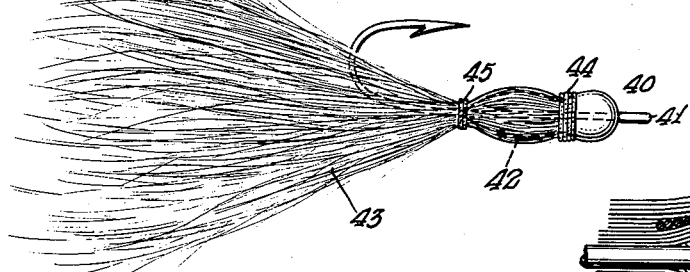
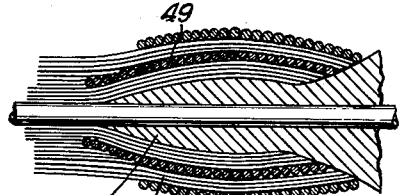
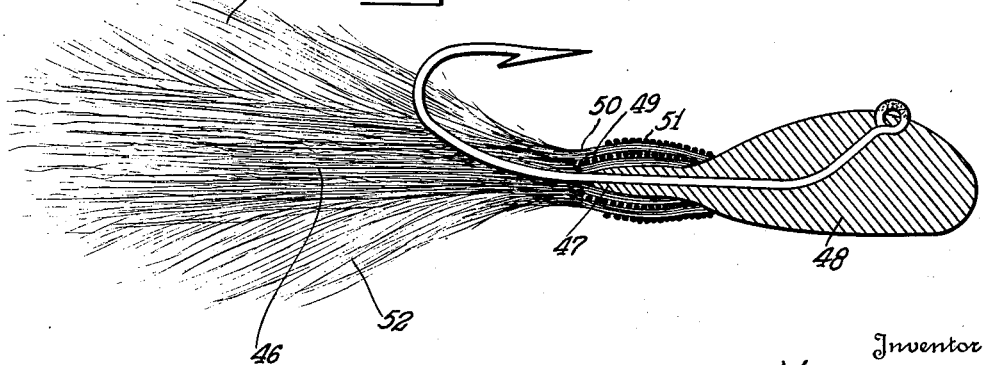
Inventor
William K. Upperman
By Pierce & Scheffler
Attorneys Patented Mar. 30, 1943

2,315,304

UNITED STATES PATENT OFFICE 2,315,304

FISH LURE

William K. Upperman, Atlantic City, N. J.

Application November 5, 1941, Serial No. 417,946

13 Claims. (Cl. 43—42)

The invention relates to fish lures or artificial bait.

A primary object of the invention is to provide a fish lure which may be used as a dangling, jigging or trolling lure and which at all times will have a life-like action when in the water, resembling the natural food of fish.

Numerous proposals have been made for fish lures constructed with a weight rigidly secured on the shank of a fish hook and with a "bucktail" or feathers fastened thereon to conceal the hook. However, in all of the prior proposals, the balance of the lure on the line was such that the lure did not "fish" naturally, that is the action of the lure in the water did not resemble the action of a live fish. This fault of prior lures is accentuated when there is slack in the line. Another objection to prior lures has been the tendency to produce a bubble caused by water passing through the eye of the hook. These bubbles are objectionable because the fish will often strike at the bubble and miss the hook entirely.

It is therefore another object of the invention to provide a fish lure which overcomes these and other disadvantages of prior lures, which will have the appearance of a swimming fish when being drawn through the water on a taut line and which will have the appearance and action of a wounded fish when slack occurs in the line, so that at all times in the water the lure will have a life-like action and be more attractive and deceptive to the fish.

Another object of the invention is to provide a fish lure constructed so that the largest plane of the body of the lure is vertically disposed in the water to be readily visible to fish and so as to use the least amount of weight to gain the greatest amount of visibility.

Another object of the invention is to provide a lure of streamlined construction which will create no unnecessary disturbance in the water and will not cause any eddys, bubbles or wake when drawn through the water and which will act as a bait in itself without the addition of any other bait.

Another object of the invention is to provide a fish lure constructed so that the outline thereof presents a substantially continuous unbroken line with the body of the weight of the lure close to the eye of the hook and partially embedding the portion thereof adjacent the shank.

Another object of the invention is to provide a fish lure with a weighted body mounted on the shank of a hook and having a bulbous forward portion adjacent the eye of the hook and a rearwardly extending tapered neck portion around the shank and with a bucktail or "feathers" extending over the neck portion and secured thereon by bindings or the like at least at both extremities of the neck portion so as to give the attached end portion of the bucktail or "feathers" a tapered form resembling a part of the body portion of a minnow or small fish.

Another object of the invention is to provide a fish lure with a body forming weight secured on the shank of a hook and in which the shank of the hook is bent or curved within the body to emerge at the top thereof rearwardly of the forward end or nose of the body and disposed in the plane of the bill of the hook and substantially in line with barb thereof.

Other objects and advantages of the invention will become apparent during the course of the following detailed description of the several preferred embodiments thereof which are illustrated in the accompanying drawings by way of example.

In the drawings:

Fig. 1 is a side elevation of a fish lure embodying the invention,

Fig. 2 is a top plan view thereof,

Fig. 3 is a central vertical section through the same,

Fig. 4 is a side elevation of a modified form of the invention,

Fig. 5 is a side elevation of another modification,

Fig. 6 is a side elevation of a further modification,

Fig. 7 is a central vertical section through a lure embodying a modification in the manner of attaching the bucktail, Fig. 8 is a fragmentary enlarged sectional view, similar to Fig. 3, and Fig. 9 is a fragmentary enlarged sectional view, similar to Fig. 7.

Referring more particularly to the form of the invention shown in Figs. 1 to 3, 10 designates the shank of a fish hook formed with the usual bill 11 terminating in a barb 12. A streamlined body 13 is cast or otherwise formed on the shank of the hook. This body which may be formed of lead, synthetic plastics or other material having sufficient weight for the purpose, is elongated and preferably somewhat flattened on the sides and is disposed with its main central plane coincident with the plane of the bill of the hook. The portion of the shank of the hook within the body is inwardly bent, as indicated at 14 in Fig. 3, so as to form an angularly disposed terminal portion 15 terminating in the eye 16 which emerges at the top of the body 13 rearwardly of the rounded nose portion thereof so that a substantial portion of the weight of the body 13 is disposed forwardly of a vertical line through the eye.

The body 13 tapers rearwardly from the eye 16 to a rearwardly extending terminal or neck portion 18 surrounding the shank 10. The neck portion 18 is tapered from the main body to the tip end thereof and is encased by the forward ends of the hairs of a bucktail 19. The hairs are held in place by wrappings 20 of silk or the like at the base of the neck adjacent main body 13 and by wrappings 21 at the tip of the neck. The portion 22 of the hairs 19 covering the neck 18 between the wrappings 20 and 21 is preferably coated with lacquer and additional wrappings may also be provided over this area. The spaced securing wrappings, or continuous wrappings over the extent of the neck portion 18 cause the trailing portion of the bucktail to assume and hold a tapered form and to cling together sufficiently to present a life-like appearance.

The eye 16 of the hook is disposed in the plane of the bill 11 of the hook and in substantial longitudinal alinement with the barb 12 so as to be presented edgewise to the water as the lure is drawn forward, thereby eliminating any possibility of producing bubbles, and is partially covered by the material of the body 13 so as to present as little a projection as possible from the curved surface of the body. The distribution of the weight of the lure is such that the eye 16 is disposed substantially above the center of gravity, preferably a little forward thereof so that the drag of the bucktail is sufficient to cause the lure to ride level with the bill up when drawn through the water.

The slanting face or edge of the body 13 extending rearwardly from the eye 16 to the neck 18 provides ample room for the mouth of a fish to come into contact with the barb of the hook.

The form of the invention shown in Fig. 4 embodies the general characteristics described above but is used when making lures with hooks having shorter shanks. In this form, the body 25 is molded on the shank 26 which is likewise bent within the body to emerge at the top thereof, as indicated in dotted lines, with the eye 27 protruding from the upper edge. The body 25 is relatively slightly shorter in the longitudinal dimension and wider in the vertical dimension than the body 13 and tapers more sharply from the eye 27 rearwardly to the tapered neck portion 28 extending along the shank 26. A bucktail 29 is secured on the neck 28 by spaced wrappings 30 and 31 at the base and tip of the neck as in the previously described form of the invention.

The modification illustrated in Fig. 5 is appropriate for smaller hooks and includes a forward body portion 32 resembling the head of a minnow with the shank 33 of the hook extending through the body and terminating in the exposed eye 34 at the top of the body rearwardly of the nose of the body. A tapered neck portion 35 has a bucktail 36 secured thereon by spaced wrappings 37 and 38 at the base and tip of the neck, respectively.

The modification illustrated in Fig. 6 is appropriate for very small hooks and includes a body 40 molded on the shank of the hook close to the eye 41 and terminating rearwardly in a tapered neck 42, extending along the shank, to which the bucktail 43 is attached by spaced wrappings 44 and 45. In this lure, the bucktail covers the major portion of the weight since the neck preferably contains more material than the forwardly exposed bulbous part of the body.

In all forms of the invention, the portion of the bucktail, feathers or the like secured over the neck portion of the weighted body is preferably protected by lacquer or other plastic covering and may, if desired, be additionally secured and protected by additional wrappings intermediate the spaced wrappings at the ends of the neck in each instance.

Fig. 7 illustrates a further modification of the invention as regards the make-up and manner of attaching the bucktail to the lure. This embodiment of the invention is practiced where a heavier or bushier bucktail is desired and comprises an inner layer or bunch of hairs 46 positioned around the neck 47 of a streamlined body 48, which may be similar to any of those previously described, and secured by wrappings 49. The wrappings 49 in addition to being located at the base and tip of the neck, also preferably are continuous along the length thereof to firmly bind the inner bunch of hair and to form a firm core for an outer bunch or layer of hairs 50 overlying the inner bunch and wrappings therefor. The outer layer of hairs is secured by wrappings 51 which extend from the base of the neck 47 rearwardly and terminate short of the under wrappings at tip thereof so that the outer layer of hairs is caused to fan out more, as indicated at 52.

In all forms of the invention, the hairs of the bucktails are laid heavier at the top and bottom of the necks than at the sides so that they fan out principally in the vertical plane, thereby carrying through the streamlined formation and increased lateral visibility of the body, while at the same time acting somewhat as a rudder or stabilizer fin rearwardly of the body.

The body of the lure may be painted as desired to increase its attractiveness and visibility. This is particularly desirable where lead is used, but is not necessary where the body is made of colored plastics as these may be made in a variety of colors without the use of paint.

Although preferred embodiments of the invention have been shown and described by way of illustration, it will be understood that various other modifications and changes in the details and materials of construction may be resorted to without departing from the spirit of the invention within the scope of the appended claims. Where the trailing dress or ruff of the lure is defined as a "bucktail" in the specification and claims, it will be understood that this is primarily for convenience and that other materials than natural deer tail hair are contemplated by this term.

I claim:

1. A fish lure comprising a hook, a weight body secured on the shank of the hook comprising a forward body portion surrounding the shank at the eye and a rearwardly tapering neck portion integral with the body portion and extending along and around the shank from the body portion in the direction of the bill of the hook, and a bucktail secured on the neck portion, the forward portion of the bucktail completely surrounding and covering the neck portion and the shank of the hook protruding rearwardly therefrom and firmly secured thereon by wrappings at least at the base and tip of the neck portion.

2. A fish lure comprising a hook having a shank and an eye at the forward end of the shank, a weight body comprising a forward bulbous portion surrounding the forward end portion of the shank to the base of the eye and a rearwardly extending integral neck portion surrounding the shank, said neck portion being coaxial with the shank and tapered from its base at the juncture with the bulbous portion rearwardly to its tip, a bucktail completely enclosing said neck portion and the rearwardly extending portion of said shank and wrappings fastening said bucktail on said neck at the base and tip thereof.

3. A fish lure comprising a hook having a shank and an eye at the forward end of the shank, a flattened weight body secured on and surrounding said shank immediately adjacent said eye with its major central plane substantially in the plane of the bill of said hook, said weight body having a protuberance extending forwardly beyond said eye and a rearwardly extending neck portion extending along the shank of the hook, and a bucktail fastened on said neck portion.

4. A fish lure comprising a hook having a shank and an eye at the forward end of the shank, a flattened weight body secured on said shank immediately adjacent said eye, said shank extending through said body to the upper edge thereof and said eye being exposed at said upper edge rearwardly of the forwardmost portion of said body and a bucktail secured on said shank and extending rearwardly from said body.

5. A fish lure comprising a hook having a bill, a shank and an eye at the forward end of the shank, a weight body secured on and surrounding said shank immediately adjacent said eye, said body being flattened with its major central plane in the plane of the bill of the hook, said shank extending through said body to the upper edge thereof and said eye being exposed at said upper edge intermediate the ends of the body, and a bucktail secured on said shank and extending rearwardly on said body.

6. A fish lure comprising a hook having a bill, a shank and an eye at the forward end of the shank, a weight body secured on and surrounding said shank immediately adjacent said eye, said body being flattened with its major central plane in the plane of the bill of the hook, said shank extending through said body to the upper edge thereof and said eye being exposed at said upper edge and disposed intermediate the ends of the body in substantial alinement with the barb of the hook.

7. A fish lure comprising a hook having a bill, a shank and an eye at the forward end of the shank, a weight body secured on and surrounding said shank immediately adjacent said eye, said body being flattened with its major central plane in the plane of the bill of the hook, said shank extending through said body to the upper edge thereof and said eye being exposed at said upper edge and disposed intermediate the ends of the body in the plane of the bill and in substantial alinement with the barb of the hook.

8. A fish lure comprising a hook having a bill and a shank terminating in an eye at the forward end thereof, an elongated flattened weight secured on said shank with its major central plane substantially in the plane of said bill, said shank extending through said body to the upper edge thereof rearwardly of the forward end thereof and said eye being exposed at this point and a bucktail secured on said shank extending rearwardly from said body.

9. A fish lure comprising a hook having a bill and a shank terminating in an eye at the forward end thereof, an elongated flattened weight secured on said shank with its major central plane substantially in the plane of said bill said shank extending through said body to the upper edge thereof rearwardly of the forward end thereof and said eye being exposed at this point said body being tapered rearwardly from said eye and terminating in a neck portion surrounding said shank, and a bucktail secured on said neck portion.

10. A fish lure comprising a hook having a bill and a shank terminating in an eye at one end thereof, a flattened weight positioned on said shank adjacent the eye, the shank extending through said weight in substantially the major central plane thereof and having the portion thereof within the weight bent inwardly to extend to and having the eye thereof protruding at the upper surface of the weight intermediate the extremities thereof.

11. A fish lure comprising a weight in the form of a flattened streamlined body, a hook having a bill and a shank extending forwardly from said bill into the trailing end of and through the body in substantially the major central plane thereof and terminating in an eye disposed in the plane of the bill and projecting from the upper surface of the body intermediate the ends thereof.

12. A fish lure comprising a hook having a bill and a shank terminating in an eye at one end thereof, a flattened weight positioned on said shank adjacent the eye, the shank extending through said weight in substantially the major central plane thereof and having the portion thereof within the weight bent inwardly to extend to and having the eye thereof protruding at the upper surface of the weight intermediate the extremities thereof, said weight being tapered toward the rear thereof and terminating in a neck portion extending rearwardly along the shank, and a bucktail secured on and concealing said neck portion.

13. A fish lure comprising a hook having a bill and a shank terminating in an eye at one end thereof, a flattened weight positioned on said shank adjacent the eye, the shank extending through said weight in substantially the major central plane thereof and having the portion thereof within the weight bent inwardly to extend to and having the eye thereof protruding at the upper surface of the weight intermediate the extremities thereof, said weight having a rounded nose portion disposed forwardly of the eye of the hook and being tapered rearwardly from the eye to a neck portion extending rearwardly along the shank, a bucktail having the forward end enclosing said neck portion, and wrappings fastening said bucktail on said neck at the base and tip thereof.

WILLIAM K. UPPERMAN.